Feb. 10, 1970  D. E. GREEN ET AL  3,494,174
GAS CHROMATOGRAPHY APPARATUS
Filed Jan. 30, 1968  2 Sheets-Sheet 1
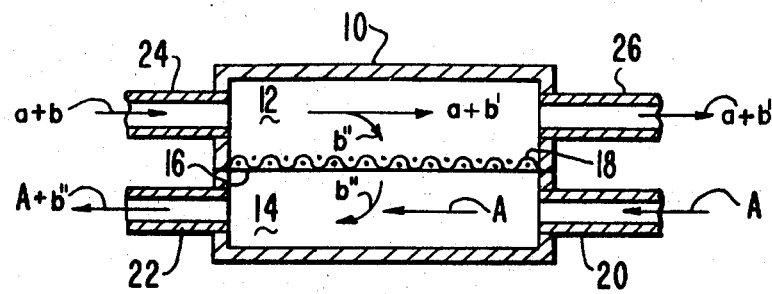
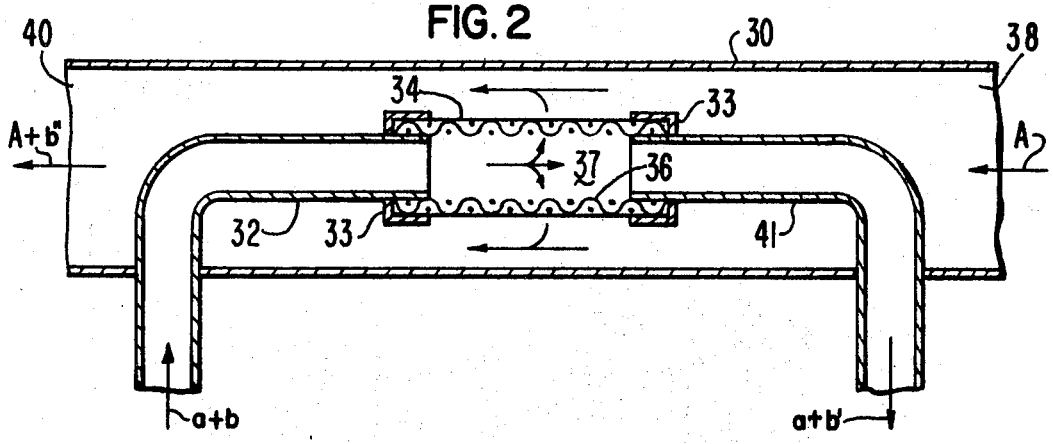
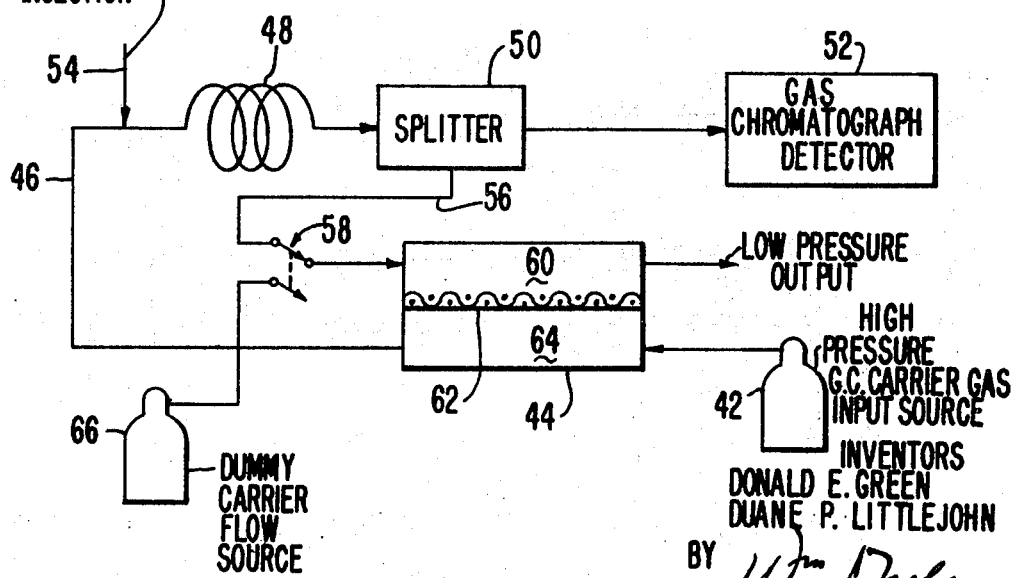
INVENTORS
DONALD E. GREEN
DUANE P. LITTLEJOHN
BY
ATTORNEY Feb. 10, 1970  D. E. GREEN ET AL  3,494,174
GAS CHROMATOGRAPHY APPARATUS
Filed Jan. 30, 1968  2 Sheets-Sheet 2
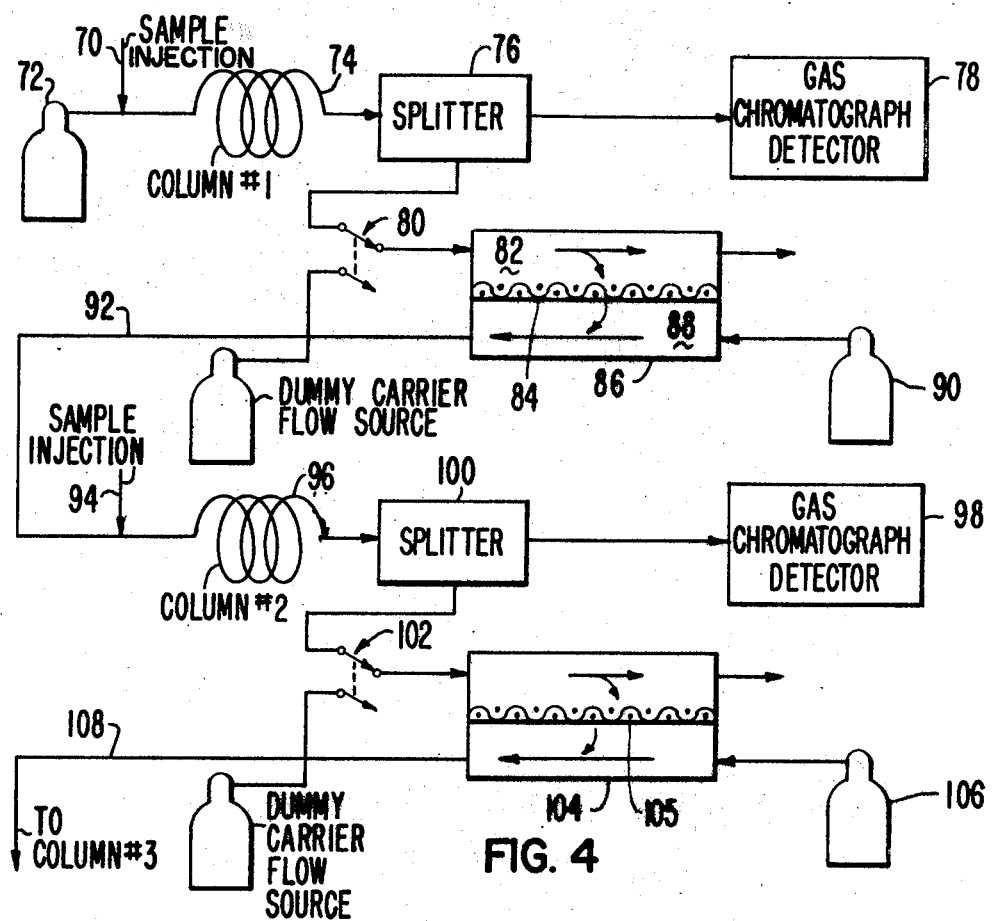
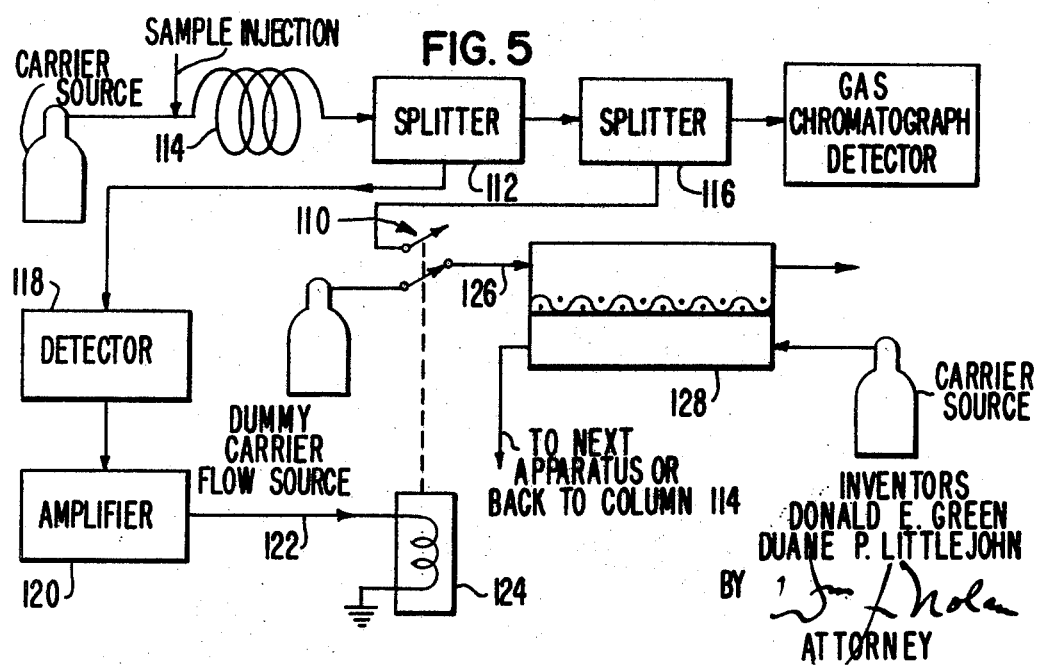
INVENTORS
DONALD E. GREEN
DUANE P. LITTLEJOHN
BY
ATTORNEY United States Patent Office 3,494,174
Patented Feb. 10, 1970

3,494,174
GAS CHROMATOGRAPHY APPARATUS
Donald E. Green, Sunnyvale, and Duane P. Littlejohn, Santa Clara, Calif., assignors to Varian Associates, Palo Alto, Calif., a corporation of California
Filed Jan. 30, 1968, Ser. No. 701,726
Int. Cl. G01n *31/08*
U.S. Cl. 73—23.1                                                    8 Claims

ABSTRACT OF THE DISCLOSURE

A gas chromatography system is disclosed wherein a selected portion of the column effluent may be automatically reintroduced into the system upstream of the column through a semi-permeable membrane type diffusion cell without necessitating the independent steps of collection and re-injection into the carrier stream. In another embodiment permeable membrane type diffusion cells are utilized in the serial connection of a plurality of chromatographic detection apparatus.

---

The present invention relates generally to gas chromatography apparatus and more specifically to a system and apparatus for reintroducing a sample gas back into the flow stream of a gas chromatographic apparatus or for introducing a gaseous sample into the flow stream of another apparatus.

It has for some time been well known in the art that gaseous mixtures could be separated by diffusing them through a nonporous semi-permeable membrane by applying the mixed gas at a positive pressure to one side of the membrane while reducing the pressure on the other side of the membrane. Apparatus suitable for such gas separation is disclosed in United States Patent Nos. 2,540,152, 3,250,080 and 3,335,545. However, because the diffusion rate through the material was usually regarded as being a property of the absolute pressure differential across the membrane, the past practice has been to separate by causing the diffusion to flow from a higher total gas pressure to a lower total pressure or semi-vacuum.

However, due to the fact that certain materials are "captured" by the membrane and actually go into solution therewith, diffusion occurs through a semi-permeable membrane not only between absolute or total gas pressure differentials but also between partial pressure differentials, i.e., differentials in pressure across the membrane between component gases of a mixture. In other words, where a gaseous mixture A comprised of gases B and C is disposed on one side of a semi-permeable membrane and where only gas C is disposed on the other side of the membrane and where gas B has a high diffusion rate and gas C has a low diffusion rate through the membrane, the gas B will diffuse through the membrane at a rate determined by its own partial pressure difference across the membrane independent of the direction of the absolute pressure difference between the mixture A on the one side of the membrane and the gas C alone on the other side. This phenomenon occurs even though the absolute pressure differential is in the reverse direction to the partial pressure differential of a material capable of being captured by the separating membrane.

Since the polymers and liquid state phases which normally comprise the semi-permeable membranes are characterized by generally being free of holes, the gaseous state materials can pass through such material only by diffusion. In order to diffuse through the membrane the gaseous state material must first be captured by the membrane either by entering into solution therewith or by adhering thereto. Although most gases can be captured by such membrane materials, the permanent gases generally will not be captured and it is this property of the membrane materials which enables the desirable separation of certain gaseous state materials from a given mixture. The non-permanent gases will normally readily enter into solution with the membrane material and diffuse therethrough, and when a mixture of a permanent, or carrier gas, and a non-permanent organic vapor is disposed on one side of a semi-permeable membrane the organic vapor will diffuse through the membrane at a rate dependent on the relative concentration of the organic vapor alone on the other side of the membrane, i.e., the partial pressure or concentration gradient of the organic vapor across the membrane.

Therefore, the basic property of the membrane lies in its ability to function as a liquid phase and most gaseous state materials, with the exception of helium and the permanent gases, will readily enter into solution with the membrane material and diffuse therethrough. When the carrier gas and the carried gaseous material come into contact with the membrane, partition takes place and the respective rates at which the materials are passed through the membrane are determined by their qualities of solubility and diffusion. In one example wherein helium is used to carry an organic vapor into contact with an elastomeric membrane the product of the solubility and diffusion rates for helium is very small even though the diffusion for such a small molecule is rather rapid. But the large solubility of the organic vapor results in a large permeability so that a considerably higher percentage of the organic vapor passes through the membrane. The rate of permeation $\mu$ of the vapor through the membrane can be calculated from the relationship $$\mu = SDA \times \frac{P_1 - P_2}{dt}$$

where:

S is the solubility
D is the diffusion rate
A is the surface area of the membrane
$P_1 - P_2$ is the partial pressure differential across the membrane.
$d$ is the thickness, and
$t$ is the time.

The present invention differs from prior art gas chromatography systems in that the separation and re-insertion of a particular gas is made from a low total pressure to a high total pressure through a membrane in order to re-introduce a gaseous sample into a carrier gas flow path which is typically at a higher pressure than that which can be split off from the column effluent.

Accordingly, it is an object of the present invention to provide an apparatus for transferring a portion of the effluent of a gas chromatographic column from the output of the column to another carrier gas line against a positive fluid pressure in that line.

Another object of the invention is to provide an apparatus for enabling the re-introduction of a gas chromatograph column output into the input of the column without the intermediate steps of collection and re-injection.

Still another object of the invention is to provide a means for the serial introduction of selected peaks of a gaseous sample into different columns having differing retention characteristics, thus enabling plural analysis of the same sample by analytical apparatus having independent parameters.

Additional objects and advantages of the invention will become apparent from the following description when considered together with the accompanying drawings of which:

FIG. 1 is a cross sectional view of a separator in accordance with the invention, FIG. 2 is a cross sectional view of another gas separator in accordance with the invention, FIG. 3 is a schematic diagram of a gas chromatograph system in accordance with the present invention, FIG. 4, is a schematic diagram of a serial analysis gas chromatograph apparatus in accordance with the invention, and FIG. 5 is a schematic diagram showing an automatic peak selection means for use in accordance with the present invention.

Referring now to FIG. 1 of the drawing, there is shown shown a structure 10 which forms a pair of chambers 12 and 14 separated by a semi-permeable membrane 16 which is supported by a perforated or mesh type reinforcing means 18. A pressurized carrier gas A which is not readily permeable through membrane 16 is introduced into chamber 14 through an inlet 20, passes through the chamber 14 and then exits at outlet 22. A gas $a+b$ comprised of a carrier gas $a$, which may be the gas A at a reduced pressure or another suitable carrier gas, and a gaseous sample $b$ which may be an organic vapor readily permeable through the membrane 16, is passed through an inlet 24 into the chamber 12 to exit through the outlet 26. As the gas $a+b$, which may be at a subatmospheric pressure, passes in contact with the membrane 16, a portion $b''$ of the gas $b$ goes into solution with the membrane as described above and is passed into chamber 14 where it mixes with carrier gas A and flows out of the chamber 14 through the outlet 22. The remaining gas $a+b'$, where $b'$ is the portion of gas $b$ which did not permeate through the membrane 16, passes through outlet 26 and is exhausted. It should be noted here that the gas $b''$ has passed through the membrane 16 from a low absolute pressure side of the membrane to a high absolute pressure side.

In FIG. 2 there is shown an alternate embodiment of a diffusion cell such as shown in FIG. 1 comprised of an outer tubular member 30 which encloses a portion of conduit 32 extending coaxial to the outer member 30 and through which is passed the gas $a+b$. A portion of the conduit 32 which passes through the member 30 is comprised of a semi-permeable membrane 34 which is supported by a perforated, or meshed, cylindrical member 36. The support 36 and membrane 34 are suitably secured in gas tight relationship to the conduit 32 by suitable end fittings 33. Pressurized carrier gas A is passed through the tubular member 30 through an inlet end 38 and after passing by the membrane is exited through an outlet end 40. As the gas $a+b$ passes in contact with the membrane 34 a portion $b''$ is captured by the membrane 34, permeates through the membrane 34 into chamber 37, and is carried through outlet 40 by gas A such that the gas passing through the outlet 40 is now comprised of $A+b''$. The remaining gas $a+b'$ is exhausted through the outlet end 41 of conduit 32. Should it be desirable that the higher pressure carrier gas A be conveyed through the tube 32 and the lower pressure sample mixture be introduced through tube 30 the relative positions of the support 36 and membrane 34 would necessarily need to be reversed.

In FIG. 3 there is shown a gas chromatography system in accordance with the invention incorporating diffusion cells such as shown in FIGS. 1 and 2 wherein a source 42 of pressurized carrier gas A is connected to the input or high pressure inlet of the diffusion structure 44. After passing through the diffusion structure, the gas flows through a conduit 46 to a gas chromatographic column 48 and thence through a gas flow splitter 50 to a gas chromatography detection apparatus 52. As the carrier gas is being passed through the column 48, a predetermined quantity of sample gas B is injected at 54 and at the output of the column the constituent gases of the sample are separated in accordance with the separation characteristics of the column 48. Only a small portion of the sample gas is passed to the detector 52 and the major portion $a+b$ of the separated sample, where $a$ is the carrier gas and $b$ is the sample gas, is diverted by the splitter 50 and passed through a conduit 56 and selector valve 58. If the selector valve 58 is in the position shown the sample portion will be passed into the low pressure chamber 60 of the diffusion structure 44. As the sample portion $a+b$ passes through the chamber 60 and contacts the membrane 62, a certain amount $b''$ of constituent gas $b$ will go into solution with the membrane 62 and pass into chamber 64 where it is re-introduced into the carrier flow path so that $A+b''$ is now conducted through the conduit 46 to be returned to the column 48 for further separation.

It is often desirable that a means be provided so that a single peak may be selected from the output of the column 48 for return through the system. To provide such a feature a dummy carrier flow source 66 is incorporated in the system. In this system a gas flow switching means 58 is initially connected so that the dummy carrier flow is directed through the chamber 60 in order to maintain a continuous gas flow across the membrane 62. When the selected peak approaches the splitter 50 the position of the switch means 58 is changed either manually or automatically so that a portion or all of the sample peak is directed through conduit 56 to chamber 60 wherein it permeates the membrane 62 in the manner previously described and is thereby re-introduced into the column 48.

In still another test procedure in accordance with the invention, it may be desirable to form a continuous serial analysis on a given sample, or portion thereof, using different columns having different type packings, retention times, temperatures or flow rates or even different types of columns. Such analysis can be carried out by using an alternate embodiment of the invention which is disclosed in FIG. 4. In this embodiment a sample gas is injected at 70 into the carrier gas flow provided by source 72 and the mixture is passed through a first column 74 and a gas flow splitter 76 to a first gas chromatographic detector apparatus 78. By the timely actuation of the flow switching means 80 which directs a selected portion of the sample through the low pressure chamber 82 of the first diffusion cell 86 the whole spectrum or any portion thereof may be selected from the flow through the gas flow splitter 76. As the sample is passed across the low pressure chamber 82 a portion of the sample permeates the membrane 84 and enters the chamber 88 where it is introduced into the flow stream of another carrier gas which is supplied at a higher pressure by the source 90. As the resulting gaseous mixture is carried through the conduit 92 still another sample may be introduced into the flow by a second injector 94 or the gas may be presented to the column 96 otherwise uncontaminated. As suggested above, the second column 96 may have different characteristics than that of the first column 74 so that the detector 98 reveals certain additional information about the sample different from that measured by the previous detector 78.

A second gas flow splitter 100 is provided between the column 96 and detector 98 for bleeding off a portion of the column effluent which is then fed through another switch means 102 to the low pressure chamber of another diffusion cell 104. As in the previous stage the sample gas permeates the membrane 105 and is thereby introduced into a third carrier flow stream provided by the source 106. The conduit 108 conducts the flow to still further analysis apparatus which may include a third column and detection apparatus similar to the previous states or may be any other suitable type of analysis equipment.

In FIG. 5 there is disclosed an automatic peak selection apparatus for actuating the switch 110. In this alternate embodiment an additional splitter valve 112 is inserted between the column 114 and splitter 116. As the column effluent passes through the splitter 112 a small portion of the flow is diverted to a peak detector 118 which can be preset to detect any desired characteristic of the effluent gas. When the predetermined characteristic is so detected, a control signal is generated by detector 118, amplified by amplifier 120, and then fed through a line 122 to energize the solenoid 124 which actuates the switch 110. As the switch 110 is actuated the dummy source is removed from the input 126 to cell 128 and is replaced by the sample gas flow which conveyed through splitter 116. After the desired portion of the gaseous sample has been allowed to flow into cell 128 the solenoid 124 is de-energized and switch means 110 is deactivated so that the dummy source is again connected to the input of the cell 128 and the column effluent being passed through the splitter 116 to the switching means 110 is exhausted to atmosphere or is otherwise collected or disposed of. The embodiment provides automatic selection of the portion of the sample which is to be returned to column 114 or passed on to a successive analyzing apparatus.

The advantages of applicants' apparatus should now be apparent. A means has been disclosed wherein a sample gas can readily be introduced either back into its initial flow path or into another flow path even though the absolute fluid pressure in that flow path be greater than that of the sample gas flow so long as the partial pressure, or concentration, of the gaseous sample on the low pressure side of the diffusion cell membrane exceeds that on the high pressure side and so long as the diffusion rate of the gaseous sample through the cell is substantially higher than that of the carrier gas.

Many alterations and modifications of the invention will be apparent to those of skill in the art after having read the foregoing description and it is to be understood that this description is for purposes of illustration only and is in no manner intended to be limiting in any way and that we intend that the appended claims be interpreted as covering all modifications which follow within the true spirit and scope of our invention.

What is claimed is:

1. A gas chromatographic apparatus comprising: a diffusion cell having a high pressure side and a low pressure side separated by a semi-permeable membrane, a source of carrier gas connected to an inlet of said high pressure side of said cell, a gas chromatographic column the inlet of which is connected to an outlet of said high pressure side of said cell by a conduit means providing a fluid flow path therebetween, sample injector means for injecting a gaseous sample into said flow path, gas chromatographic detection means connected to the output of said column through a splitter means, fluid conduit means connecting an inlet of the low pressure side of said cell to an outlet of said splitter such that a portion of the gas passed through said splitter is caused to flow into an inlet of said cell, across the semi-permeable membrane, and then through an exhaust outlet such that a portion of said gaseous sample passes from said low pressure side of said cell into said high pressure side of said cell to therefore be reintroduced into said fluid flow path.

2. A gas chromatographic apparatus as described in claim 1 wherein said fluid conduit means includes a valve means for selectively connecting said conduit means to said inlet of said cell, thereby allowing only a selected portion of the effluent of said column to be reintroduced into said fluid flow path.

3. A gas chromatographic apparatus for serially performing plural chromatographic analysis of a given sample material comprising: a first source of carrier gas connected to the input of a first chromatographic column means, detector means coupled to the output of said first column means through a gas flow splitter means, diffusion cell means having a high pressure side and a low pressure side separated by a semipermeable membrane, conduit means establishing a fluid flow path between said splitter means and an input to the low pressure side of said diffusion cell means, a second source of carrier gas connected to an input to the high pressure side of said diffusion cell means, second chromatographic column means having its input connected to an output of said high pressure side of said diffusion cell means and second detector means responsive to the output of said second column means.

4. A gas chromatographic apparatus as described in claim 3 wherein the partitioning characteristics of the respective packing materials of said first and second chromatographic column means are different and enable dual analysis of a single sample material which has been injected into the system.

5. A gas chromatographic apparatus as described in claim 3 wherein the output of said second column means is passed through the low pressure side of a second diffusion cell means so that said sample material may be permeated through the semi-permeable membrane of said cell means and be introduced into the input of a third chromatographic column means whereby a third analysis may be serially performed on said sample material.

6. In a plural stage gas chromatographic analysis apparatus for analyzing a nonpermanent sample gas mixed with permanent carrier gas, each stage of said apparatus including a chromatographic column and sample detection apparatus the improvement comprising: diffusion cell means connecting the output of a preceding stage to the input of a succeeding stage, said cell means including a low pressure side communicating with said preceding stage and a high pressure side communicating with said succeeding stage, said low pressure side and said high pressure side being separated by a semi-permeable membrane made of a material in which the product of the solubility and diffusion rate for permanent gases is less than said product for nonpermanent gases.

7. A gas chromatographic apparatus as described in claim 6 wherein selector means are provided for selectively controlling the flow of sample material through the low pressure side of said diffusion cell means.

8. A gas chromatographic apparatus as described in claim 7 wherein detector means are provided responsive to the output of said column means for causing said selector means to be automatically activated in accordance with predetermined sample conditions.

References Cited

UNITED STATES PATENTS

| | | | |
|---|---|---|---|
| 2,617,493 | 11/1952 | Jones | 55—16 |
| 3,002,583 | 10/1961 | Findlay | 55—67 |
| 3,250,080 | 5/1966 | Garwin | 55—16 |
| 3,263,488 | 8/1966 | Martin | 55—197 |
| 3,400,514 | 9/1968 | Noda | 55—158 |
| 3,405,549 | 10/1968 | Finley | 73—23.1 |

FOREIGN PATENTS 692,119   8/1964   Canada.

REUBEN FRIEDMAN, Primary Examiner

CHARLES N. HART, Assistant Examiner

U.S. Cl. X.R.

55—158, 197